United States Patent
Duesel, Jr. et al.

(10) Patent No.: US 7,214,290 B2
(45) Date of Patent: May 8, 2007

(54) TREATMENT OF SPENT CAUSTIC REFINERY EFFLUENTS

(75) Inventors: Bernard F. Duesel, Jr., Goshen, NY (US); John P. Gibbons, Cornwall, NY (US); Michael J. Rutsch, Tulsa, OK (US)

(73) Assignees: Shaw Liquid Solutions LLC., Baton Rouge, LA (US); GEI Liquid Solutions LLC., Maryland Heights, MO (US)

( * ) Notice: Subject to any disclaimer, the term of this patent is extended or adjusted under 35 U.S.C. 154(b) by 0 days.

(21) Appl. No.: 10/234,559

(22) Filed: Sep. 4, 2002

(65) Prior Publication Data

US 2004/0040671 A1 Mar. 4, 2004

(51) Int. Cl.
B01D 1/00 (2006.01)

(52) U.S. Cl. .................. 159/16.2; 159/29; 159/44; 159/47.3; 210/739; 210/767; 423/183; 423/189; 423/209

(58) Field of Classification Search ........... 159/16.1, 159/16.2, 29, 44, 47.3; 210/739, 767, 177; 423/183, 189, 209
See application file for complete search history.

(56) References Cited

U.S. PATENT DOCUMENTS

| | | | |
|---|---|---|---|
| 1,668,504 A * | 5/1928 | Hammond | 159/47.1 |
| 3,275,062 A * | 9/1966 | Williams | 159/4.02 |
| 3,658,483 A * | 4/1972 | Lienau et al. | 422/140 |
| 3,738,411 A | 6/1973 | Lazar | |
| 3,763,915 A | 10/1973 | Peny et al. | |
| 3,835,909 A | 9/1974 | Douglas et al. | |
| 3,852,430 A * | 12/1974 | Lienau et al. | 423/481 |
| 3,912,577 A * | 10/1975 | Akune et al. | 588/235 |
| 3,920,505 A | 11/1975 | Helleur | |
| 3,940,471 A | 2/1976 | Favre | |
| 3,944,474 A | 3/1976 | Verlaeten | |
| 3,954,381 A * | 5/1976 | Marecaux | 588/320 |
| 3,962,405 A | 6/1976 | Annesser et al. | |
| 3,966,594 A | 6/1976 | Ohkawa et al. | |
| 3,985,609 A | 10/1976 | Connally | |
| 4,016,028 A | 4/1977 | Young et al. | |
| 4,047,883 A * | 9/1977 | Waters | 432/14 |
| 4,061,712 A | 12/1977 | Morgan et al. | |
| 4,079,585 A | 3/1978 | Helleur | |
| 4,085,044 A | 4/1978 | Komanowsky et al. | |
| 4,111,762 A | 9/1978 | Wade et al. | |
| 4,113,831 A | 9/1978 | Orth, Jr. et al. | |
| 4,141,701 A * | 2/1979 | Ewan et al. | 95/217 |

(Continued)

OTHER PUBLICATIONS

International Search Report issued in PCT/US03/27517 application mailed on May 7, 2004.

(Continued)

*Primary Examiner*—Virginia Manoharan
(74) *Attorney, Agent, or Firm*—Marshall, Gerstein & Borun LLP (57) ABSTRACT

In the methods for treatment of caustic effluents described in the specification, a spent caustic refinery effluent is supplied to a submerged combustion gas evaporator in which hot combustion gas containing carbon dioxide is injected into the caustic liquid to concentrate the liquid and convert a hydroxide constituent to a carbonate. Where the caustic effluent is from a petroleum refinery, oil in the waste liquid is separated from the aqueous constituent before, during or after concentration.

24 Claims, 3 Drawing Sheets

U.S. PATENT DOCUMENTS

| | | |
|---|---|---|
| 4,188,291 A | 2/1980 | Anderson |
| 4,250,158 A | 2/1981 | Solbakken et al. |
| 4,272,341 A | 6/1981 | Lamb |
| 4,285,820 A | 8/1981 | Akune |
| 4,342,599 A | 8/1982 | Mann et al. |
| 4,350,599 A | 9/1982 | Chowdhury |
| 4,366,063 A | 12/1982 | O'Connor |
| 4,417,961 A | 11/1983 | Ezzell et al. |
| 4,434,057 A | 2/1984 | Marquardt |
| 4,435,269 A | 3/1984 | Gomory |
| 4,464,345 A | 8/1984 | Yan |
| 4,475,347 A | 10/1984 | Hegarty et al. |
| 4,479,926 A | 10/1984 | Behrmann et al. |
| 4,499,060 A | 2/1985 | Ritter et al. |
| 4,518,489 A | 5/1985 | Hitzman |
| 4,539,030 A | 9/1985 | Demarest, Jr. et al. |
| 4,618,480 A | 10/1986 | Hazen et al. |
| 4,626,426 A | 12/1986 | Rado |
| 4,668,486 A | 5/1987 | Brown et al. |
| 4,670,229 A | 6/1987 | Wiewiorowski |
| 4,702,317 A | 10/1987 | Shen |
| 4,753,722 A | 6/1988 | Le et al. |
| 4,794,022 A | 12/1988 | Johnson et al. |
| 4,816,189 A | 3/1989 | Rothbart et al. |
| 4,826,600 A | 5/1989 | Ely et al. |
| 4,855,037 A | 8/1989 | Murakami et al. |
| 4,855,050 A | 8/1989 | Senyard, Sr. et al. |
| 4,892,929 A | 1/1990 | Geibel et al. |
| 4,927,856 A | 5/1990 | Elion |
| 4,937,004 A | 6/1990 | Mandrin et al. |
| 4,959,158 A | 9/1990 | Meikrantz |
| 4,977,840 A | 12/1990 | Summers |
| 4,997,933 A | 3/1991 | Rahman |
| 5,032,230 A | 7/1991 | Shepherd |
| 5,032,273 A | 7/1991 | Senyard, Sr. et al. |
| 5,032,682 A | 7/1991 | Sau |
| 5,056,596 A | 10/1991 | McKay et al. |
| 5,059,307 A | 10/1991 | Meryers et al. |
| 5,063,633 A | 11/1991 | Ingermann et al. |
| 5,069,689 A | 12/1991 | Goldhaar |
| 5,124,008 A | 6/1992 | Rendall et al. |
| 5,130,107 A | 7/1992 | DeMunck et al. |
| 5,143,007 A | 9/1992 | Laukien et al. |
| 5,160,623 A | 11/1992 | Rubin |
| 5,192,422 A | 3/1993 | So |
| 5,217,621 A | 6/1993 | Norris |
| 5,223,154 A | 6/1993 | MacPherson, Jr. et al. |
| 5,244,576 A | 9/1993 | DeRoeck et al. |
| 5,250,175 A | 10/1993 | Des Ormeaux |
| 5,254,253 A | 10/1993 | Behmann |
| 5,262,134 A | 11/1993 | Frint et al. |
| 5,264,114 A | 11/1993 | Dunbar |
| 5,268,104 A | 12/1993 | Masoomain |
| 5,269,934 A | 12/1993 | Dubrovsky et al. |
| 5,283,054 A | 2/1994 | Copenhafer et al. |
| 5,302,611 A | 4/1994 | Keplinger et al. |
| 5,340,440 A | 8/1994 | Henricson |
| 5,342,482 A | 8/1994 | Duesel, Jr. |
| 5,354,482 A | 10/1994 | Varadi |
| 5,368,726 A | 11/1994 | Masoomian |
| 5,372,621 A | 12/1994 | Staton et al. |
| 5,378,322 A | 1/1995 | Hornsey |
| 5,411,665 A | 5/1995 | Scruggs et al. |
| 5,434,329 A | 7/1995 | Lehr |
| 5,439,489 A | 8/1995 | Scalliet et al. |
| 5,458,780 A | 10/1995 | Evans |
| 5,460,732 A | 10/1995 | Momont |
| 5,486,627 A | 1/1996 | Quarderer, Jr. et al. |
| 5,520,571 A | 5/1996 | Brown et al. |
| 5,523,060 A | 6/1996 | Hogan |
| 5,558,775 A | 9/1996 | Busch, Jr. |
| 5,560,900 A | 10/1996 | Gbordzoe et al. |
| 5,606,965 A | 3/1997 | Panz et al. |
| 5,609,765 A | 3/1997 | Bowman |
| 5,624,502 A | 4/1997 | Defraites, Jr. |
| 5,624,562 A | 4/1997 | Scroggins |
| 5,626,743 A | 5/1997 | Humphreys |
| 5,642,630 A * | 7/1997 | Abdelmalek et al. ......... 62/632 |
| 5,643,474 A | 7/1997 | Sangeeta |
| 5,675,055 A | 10/1997 | Evans et al. |
| 5,685,917 A | 11/1997 | Sangeeta |
| 5,705,074 A | 1/1998 | Brient |
| 5,723,097 A | 3/1998 | Barnett et al. |
| 5,732,766 A | 3/1998 | Hunter et al. |
| 5,735,916 A | 4/1998 | Lucas et al. |
| 5,770,049 A | 6/1998 | Humphreys |
| 5,779,809 A | 7/1998 | Sangeeta |
| 5,807,486 A | 9/1998 | Busch, Jr. |
| 5,817,243 A | 10/1998 | Shaffer |
| 5,858,065 A | 1/1999 | Li et al. |
| 5,879,562 A | 3/1999 | Garbutt |
| 5,879,637 A | 3/1999 | Titmas |
| 5,891,346 A | 4/1999 | Huntley |
| 5,892,122 A | 4/1999 | Ostermaier et al. |
| 5,908,040 A | 6/1999 | Defraites, Jr. |
| 5,914,034 A | 6/1999 | Ding et al. |
| 5,914,130 A | 6/1999 | Whang |
| 5,919,285 A | 7/1999 | Li et al. |
| 5,928,125 A | 7/1999 | Ding et al. |
| 5,928,522 A | 7/1999 | Conaway |
| 5,934,207 A | 8/1999 | Echols et al. |
| 5,948,260 A | 9/1999 | Attaway, III et al. |
| 5,968,654 A | 10/1999 | Sawan et al. |
| 5,997,731 A | 12/1999 | Suarez |
| 6,027,608 A | 2/2000 | Gassner |
| 6,033,576 A | 3/2000 | Russo |
| 6,036,748 A | 3/2000 | Wallace et al. |
| 6,042,629 A | 3/2000 | McGarrity |
| 6,056,882 A | 5/2000 | Scalliet |
| 6,059,118 A | 5/2000 | Ding et al. |
| 6,077,976 A | 6/2000 | McNabb |
| 6,093,845 A | 7/2000 | Van Acker et al. |
| 6,096,227 A | 8/2000 | Conaway |
| 6,099,655 A | 8/2000 | Fair et al. |
| 6,113,797 A | 9/2000 | Al-Samadi |
| 6,126,781 A | 10/2000 | Joseph et al. |
| 6,126,836 A | 10/2000 | Ding et al. |
| 6,168,723 B1 | 1/2001 | Moody |
| 6,174,412 B1 | 1/2001 | Paterson-Brown et al. |
| 6,180,079 B1 | 1/2001 | Shimizu |
| 6,200,381 B1 | 3/2001 | Rechichi |
| 6,204,421 B1 | 3/2001 | Genssler et al. |
| 6,210,583 B1 | 4/2001 | Kurukchi et al. |
| 6,214,236 B1 | 4/2001 | Scalliet |
| 6,267,902 B1 | 7/2001 | Cartier et al. |
| 6,293,277 B1 | 9/2001 | Panz et al. |
| 6,293,975 B1 | 9/2001 | Scalliet et al. |
| 6,338,337 B1 | 1/2002 | Panz et al. |
| 6,340,581 B1 | 1/2002 | Gaddy |
| 6,340,736 B1 | 1/2002 | Coenen et al. |
| 6,345,672 B1 | 2/2002 | Dietzen |
| 6,350,289 B1 | 2/2002 | Holcombe et al. |
| 6,372,129 B1 | 4/2002 | Moody |
| 6,399,848 B1 | 6/2002 | Rechichi |

OTHER PUBLICATIONS

Written Opinion issued in PCT/US03/27517 application mailed Nov. 26, 2004.

\* cited by examiner

TREATMENT OF SPENT CAUSTIC REFINERY EFFLUENTS

BACKGROUND OF THE INVENTION

This invention relates to processes for treating spent caustic effluents, for example, effluents from petroleum refineries, aluminum manufacturing, food processing or the like.

Many industrial operations generate dilute spent caustic effluents such as petroleum refining processes. A typical dilute spent caustic effluent from such refineries may contain about 5% to 12% sodium hydroxide (w/w) with varying but significant quantities of organic compounds that include a range of mercaptans, sulfidic oils, naphthenic acids, cresylic acids and derivatives. Included in the mixture are lesser quantities of other inorganic and organic compounds. In addition, a petroleum refinery effluent may contain approximately 5% to 20% by volume of oil along with the aqueous caustic solution. Traditionally such effluents have been considered essentially useless waste streams but have required significant processing before disposal to avoid contamination of the environment.

The patent to Helleur No. 4,079,585 describes a method and apparatus for removal and recovery of a constituent from industrial and municipal waste streams by evaporation and concentration of the constituent as a result of intimate and turbulent contact between the waste stream liquid and hot gases produced by combustion in a scrubbing tower and states that submerged combustion techniques can also be used to advantage in the process. According to that patent undesirable volatile pollutants can be removed without vaporizing them by addition of an alkali such as lime or caustic to retain acidic volatile pollutants such as sulfur dioxide, hydrogen sulfide, etc. in solution so that they can be disposed of in liquid form. The Helleur patent describes the process as being applicable to spent material from such industries as the oil industry and notes that, to avoid vaporization of selected combustible volatiles, the temperature of the combustion gases should be maintained below the flash point of the volatiles by cooling the combustion gas before contact with the liquid.

The Young et al. U.S. Pat. No. 4,16,028 discloses a submerged combustion evaporator as the first stage in a process for concentration of constituents of industrial waste streams.

In the Ohkawa et al. U.S. Pat. No. 3,966,594, treatment of waste water containing water-soluble organic substances in various ways is described and the submerged combustion method is stated to be industrially insufficient in terms of concentration and combustion. Instead, that patent describes a process in which the waste water is treated with a water-insoluble organic solvent solution of an organic constituent.

According to the Anderson U.S. Pat. No. 4,188,291 industrial waste water is processed by a submerged combustion evaporator and carbon dioxide in the combustion gases supplied to the waste water is sequestered by calcium hydroxide which has been added to produce calcium carbonate which is then separated from the waste stream.

The spent caustic treatment process described in the DeRoeck et al. U.S. Pat. No. 5,244,576 introduces refinery gases containing carbon dioxide and hydrogen sulfide into a sodium hydroxide solution to convert the carbon dioxide to sodium carbonate.

In the Connally U.S. Pat. No. 3,985,609 concentration of constituents in a liquid to be concentrated is effected by supplying the liquid to a submerged combustion evaporator.

The Echols U.S. Pat. No. 5,934,207 describes evaporation of leachate by directing flames from a burner to which landfill gas is supplied into a fire tube heater immersed in a tank containing leachate so as to heat and vaporize the liquid constituents in the leachate while disposing of the landfill gas.

The Duesel U.S. Pat. No. 5,342,482 discloses the use of landfill gas as a fuel source for a submerged combustion gas evaporator in a leachate evaporation process.

SUMMARY OF THE INVENTION

Accordingly, it is an object of the present invention to provide a process for treating spent caustic refinery effluents which overcomes disadvantages of the prior art.

Another object of the invention is to provide a process for treating caustic effluents from a refinery to convert a caustic constituent to a useful commercial product.

A further object of the invention is to provide a process for treating petroleum refinery effluents to produce a reusable oil product as well as a converted caustic product.

An additional object of the invention is to provide a process for treating caustic effluents utilizing carbon dioxide in a combustion gas supplied to the effluent to convert a caustic constituent to a carbonate.

These and other objects of the invention are attained by supplying a caustic effluent to a submerged combustion gas evaporator to which combustion gases are supplied at a temperature and quantity selected to remove undesired vapor and gases while retaining a desired liquid constituent of the effluent, and separating the desired constituent from the remaining constituents of the effluent. In a particular embodiment of the invention the caustic effluent is a petroleum refinery effluent and carbon dioxide in the combustion gas supplied to the effluent converts a caustic constituent in the effluent to a carbonate such as sodium carbonate. In addition, oil is separated from the other effluent constituents, before, during or after evaporation, for reuse or further refining.

According to another aspect of the invention, at least some of the fuel used to supply combustion gas to the submerged combustion gas evaporator is landfill gas and the carbon dioxide content of the combustion gas is used to convert the caustic constituent of the effluent to a carbonate, thereby preventing dissemination of the carbon dioxide into the atmosphere.

In a representative embodiment of the invention the spent effluent supplied to the submerged combustion gas evaporator has an equivalent sodium hydroxide content of about 5% to 12% weight percent and an oil content of about 5% to 20% by volume and the aqueous content of the spent effluent is reduced by evaporation as required to produce a desired carbonate concentration. The concentrated liquid may contain about 20% to 30% sodium carbonate and the oil constituent is separated for reuse after concentration by a gravity separator.

BRIEF DESCRIPTION OF THE DRAWINGS

Further objects and advantages of the invention will be apparent from a reading of the following description in conjunction with the accompanied drawings in which.

DESCRIPTION OF PREFERRED EMBODIMENTS

In the representative arrangement for carrying out the process of the invention schematically illustrated in FIG. 1, a submerged combustion gas evaporator 10, which is described in more detail in connection with FIG. 2, receives combustible gas from a landfill or other biogas source 11 or from an alternative fuel source 12 providing natural gas, propane, butane or the like or providing a liquid fuel such as waste petroleum oils or the like or from both. The evaporator 10 may be operated on a batch, batch-continuous, or continuous basis and the fuel gas from the sources 11 and 12 may be collected and stored for use or be supplied continuously in accordance with the needs of the evaporator. In one embodiment the system is located closely adjacent to a landfill from which landfill gases are conveniently available, but, if desired, landfill gases may be piped or transported from one or more landfills at remote locations to processing stations adjacent to a source of caustic effluent liquid such as a refinery or other manufacturing facility.

Figure 1:
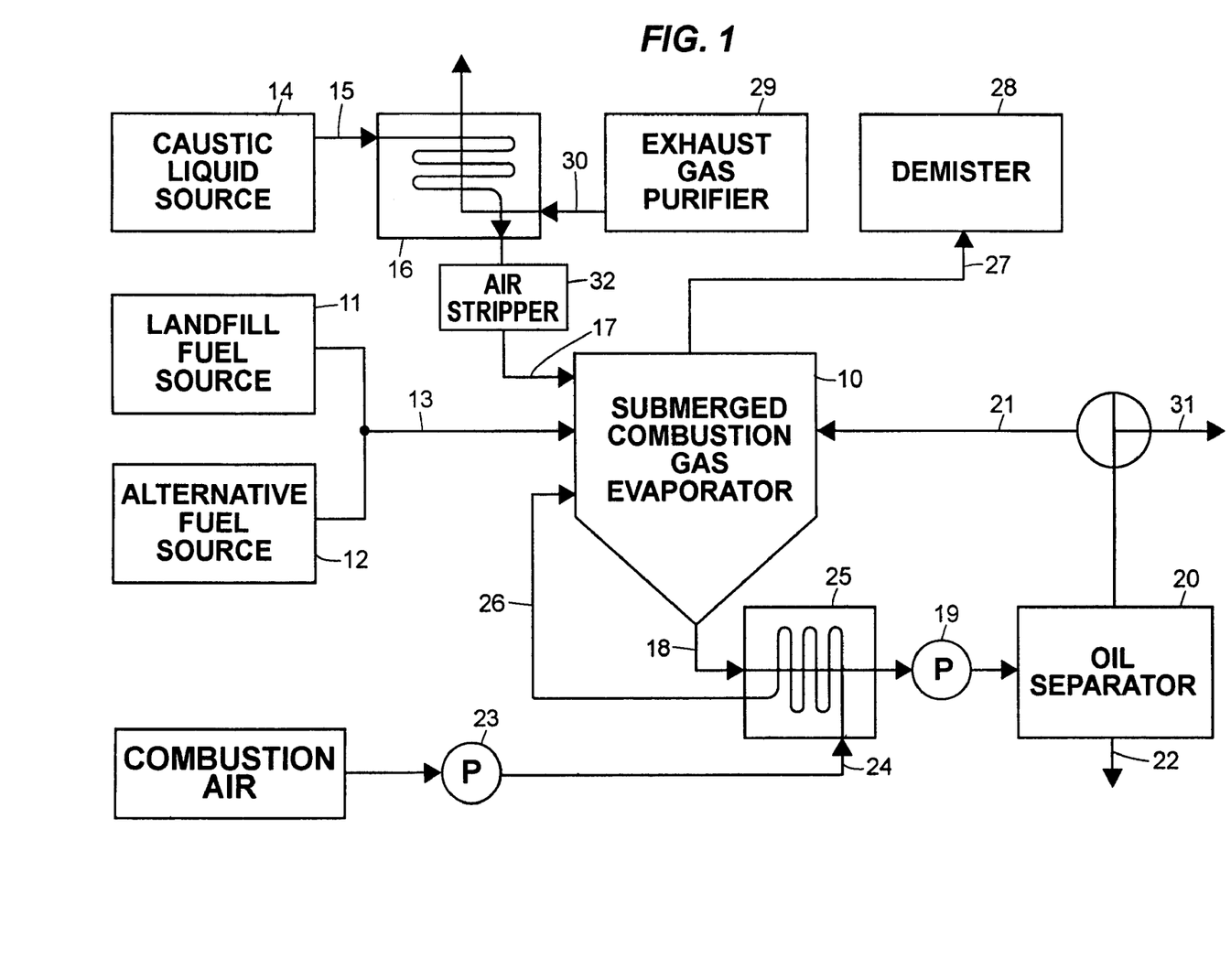
FIG. 1 is a schematic block diagram illustrating a representative embodiment of an arrangement for carrying out a process for treating caustic effluents in accordance with the invention.

In the embodiment illustrated in FIG. 1 a caustic liquid from a source 14 such as spent caustic effluent from a petroleum refinery, aluminum manufacturing plant or food processing facility is transmitted through a line 15 to a heat exchange unit 16 for preheating by hot exhaust gases and then piped through a line 17 to the inlet to the submerged combustion gas evaporator 10. The caustic in the spent effluent may be sodium hydroxide or any other alkaline material and the spent effluent may be from a petroleum refinery, aluminum manufacturing plant, food processing facility or from various industrial operations such as scrubbing. The sodium hydroxide equivalency of the caustic material in the spent effluent from the source 14 is preferably in a range from about 1% to about 50%, desirably in a range from about 1% to 15% and most desirably in a range from about 2% to 12%. If the spent effluent is from a petroleum refinery and contains a substantial proportion of oil, the spent effluent may be passed through a preliminary oil and water separator (not shown) to remove at least a portion of the oil before it is delivered to the evaporator 10.

Following evaporation of vaporizable constituents from the spent effluent in the evaporator 10, concentrated liquid is removed through an outlet 18 and transmitted by a pump 19 through an oil separator 20 to remove oil from the aqueous constituents of the concentrated liquid which pass from the separator to an outlet 31. If necessary, some or all of the aqueous constituents can be recycled through a line 21 back to the evaporator 10 for further processing after separation of the oil. The separated oil is removed from the separator through a line 22 for sale, further processing or recycle. The oil separator 20 may be any conventional immiscible liquid separator such as a gravity settling tank, an inclined plate separator or a centrifuge.

Combustion air driven by a blower 23 and supplied through a line 24 is preheated by circulation through a heat exchange unit 25 through which the concentrated liquid passes from the outlet 18 and the preheated combustion air is supplied to the evaporator 10 through a line 26. The heat exchange in the unit 25 may be used to improve the efficiency of the burner. If desired some of the combustion air from the blower 23 may be diverted to an in-line air stripper 32 in the line 17 to remove volatile compounds from the spent effluent being supplied to the evaporator and supply them with the combustion air to the burner in the evaporator 10. Exhaust gases are withdrawn from the evaporator 10 through a line 27 and then passed through a demister 28 in which entrained liquid constituents are removed, after which the gas is passed through an exhaust purification unit 29 such as an enclosed flare. In the purification unit 29 volatile organic compounds and other exhaust gas constituents are thermally oxidized or otherwise treated to render them odorless and harmless before being released into the atmosphere through a line 30 which passes through the heat exchange unit 16.

Figure 2:
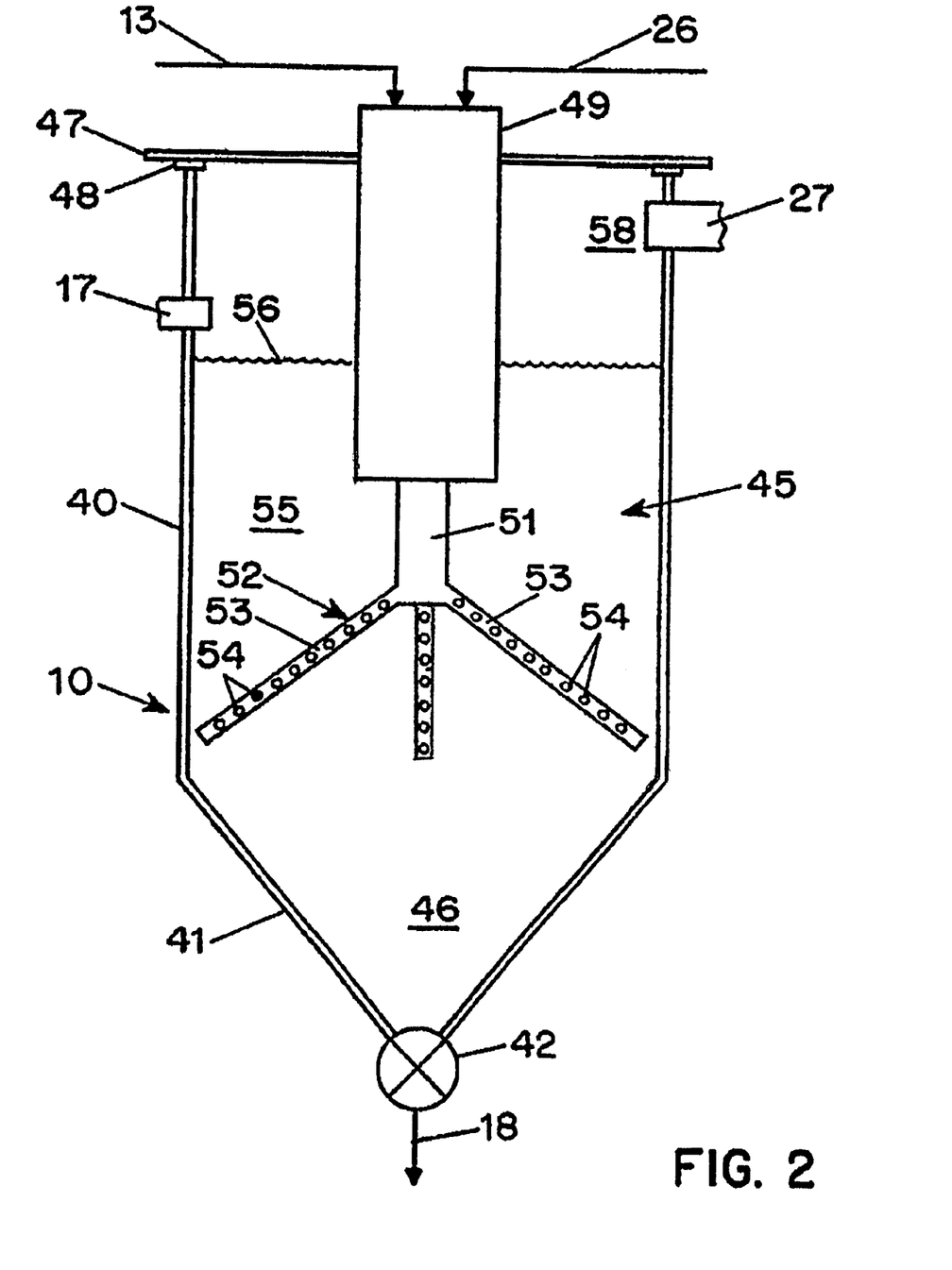
FIG. 2 is a schematic sectional view illustrating a representative embodiment of a submerged combustion gas evaporator for use in carrying out the process of the invention.

The arrangement of a preferred form of submerged combustion gas evaporator for use in the process of the invention is illustrated in FIG. 2. As shown in that figure the evaporator 10 has a housing 40 with a downwardly converging conical bottom 41 leading to a discharge valve 42 through which the concentrated aqueous caustic liquid and oil, if present, pass into the discharge line 18. Within the housing 40 liquids and entrained solids, if any, can settle and be directed by the conical housing portion 41 toward the discharge valve 42. At the top of the housing 40 a cover 47 is sealed with a sealing gasket 48 to the housing wall and a burner 49 is mounted to the cover.

Combustion gases from the burner 49 are directed downwardly through a flame and combustion gas downcomer 51 into a distributor 52 having a series of mixing sparge pipes 53. The distributor pipes have orifices 54 through which the hot combustion gases are injected into a pool 55 of the spent caustic effluent contained within the housing so as to evaporate liquid therefrom in an evaporation zone 45 by direct contact heat transfer, provide and distribute carbon dioxide to the spent effluent to effect conversion to carbonate and also drive off vaporizable constituents. Preferably, the operating pressure within the evaporator is within a range from about 50 inches negative to 100 inches positive of water.

The upper surface 56 of the caustic waste liquid pool within the housing is maintained at a desired level by controlling the supply of spent effluent admitted into the evaporator through the line 17 from the source 14. Preferably, the level of the upper surface 56 is in a range from about 5 inches to about 100 inches above that of the distributor 52 and the temperature of the pool of spent effluent 55 is in a range from about 100° F. to about 250° F. If the evaporator is being operated on a continuous basis the spent effluent is supplied to the evaporator continuously at an appropriate rate so as to maintain the surface 56 at the indicated level within the evaporator.

On the other hand, if the evaporator is being operated on a batch basis the effluent to be processed will be supplied continuously at an appropriate rate so as to maintain the surface 56 at the indicated level until the concentration of desired constituents in the effluent reaches a selected value. Thereafter the supply is terminated and the evaporator is either shut down and emptied or operation may continue until the surface of the effluent within the evaporator falls to a lower level (not shown) which is above the highest part of the gas distributor 52 at which time the evaporator will be shut down and the concentrated effluent will be discharged, after which the evaporator can be started again.

In a preferred embodiment the inlet temperature of the combustion gases in the distributor 52 is in a range from about 600° F. to 1800° F., the temperature and quantity being high enough to vaporize water and volatile constituents in the spent effluent so as to concentrate desired constituents such as oil and/or a converted caustic at a desired rate.

When operated in a batch-continuous mode, the operation proceeds as in a continuous mode except that concentrated effluents are removed periodically from the discharge 42 without lowering the liquid level or shutting down the evaporator. As indicated in FIG. 1, fuel is supplied to the burner 49 through a line 13 and combustion air is supplied to the burner through a line 26 under sufficient pressure, preferably in a range from about 5 inches to about 200 inches of water, to provide for efficient combustion and to force the combustion gases through the distributor 52 and convey the exhaust gases through the exhaust line 27.

It should be noted that, exclusive of process pumps, only a single moving member is required to carry out this process provided that a fuel supply is available at adequate pressure, i.e., the blower 23 which supplies combustion air under pressure. Accordingly, the spent caustic effluent treatment process of the invention not only removes odorous constituents from the effluent but also produces a commercially useful aqueous concentrate and separates a useful oil constituent in a simple and effective manner without the requiring complex moving parts which lead to difficulties embodied in the prior art spent caustic effluent handling systems.

Moreover, although spent caustic effluent is passed through the heat exchange units 16 and 25 in the arrangement disclosed in FIG. 1, the difficulties resulting from the prior art use of heat exchange evaporators are not encountered in those units since no evaporation is carried out in them and the consequent fouling of heat exchange surfaces is avoided. In simpler forms of spent caustic effluent treatment systems according to the invention, the heat recovery units 16 and 25 may be omitted and, if the exhaust vapor meets environmental standards for direct discharge to the atmosphere, the exhaust treatment units 28 and 29 may also be omitted.

Figure 3:
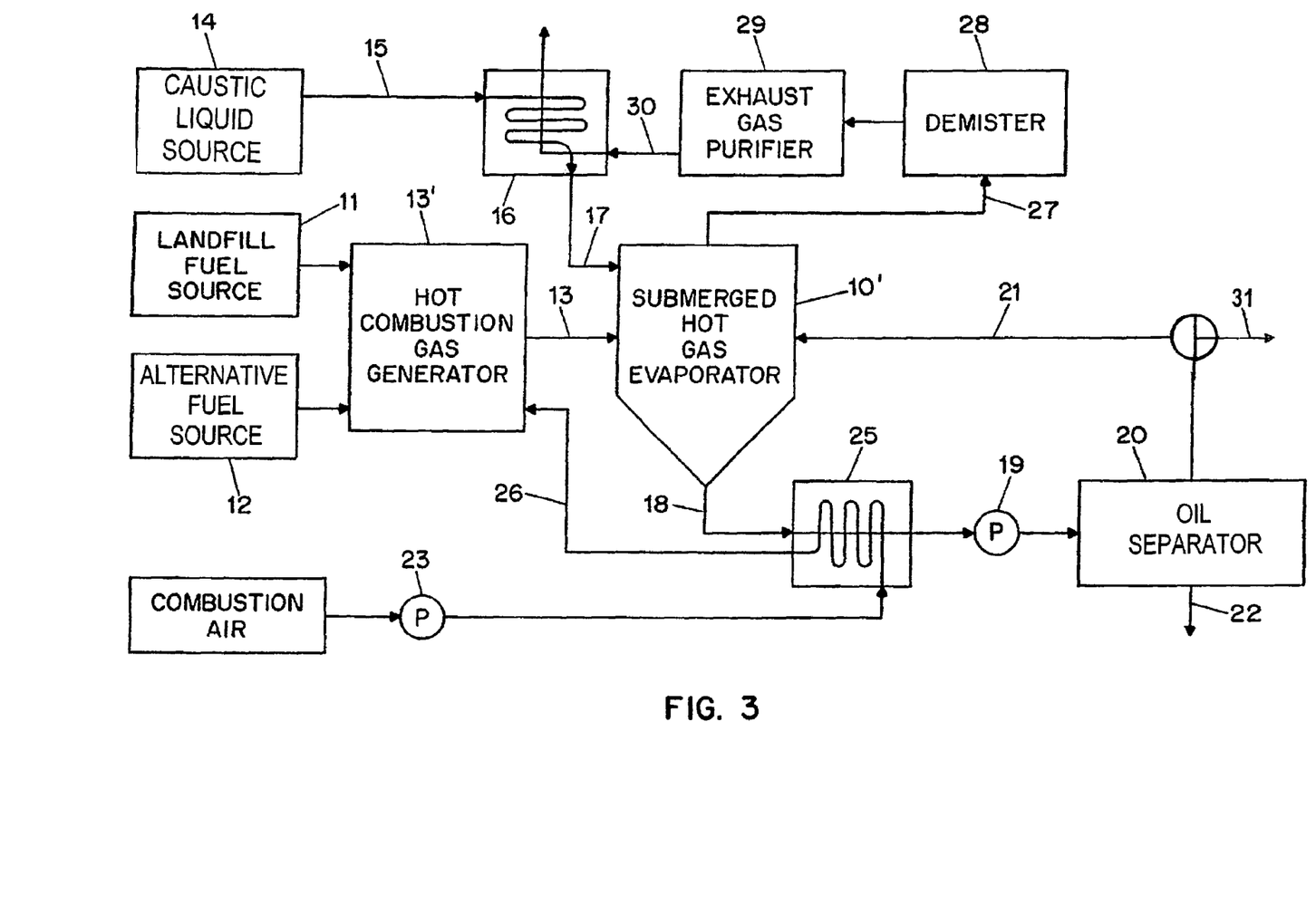
FIG. 3 is a schematic block diagram illustrating a further representative embodiment of an arrangement for treating caustic effluents in accordance with the invention.

FIG. 3 illustrates an alternative embodiment which is identical to that of FIG. 1 except that, as previously described, a source of hot gases spaced from the evaporator such as a hot gas generator 13', which may for example be an internal combustion engine, supplies hot gases through the line 13 to the hot gas distribution device 52 in a modified submerged hot gas evaporator 10', the air supply line 26 being connected to the hot gas generator 13' rather than to the evaporator 10'. In this case the hot gases from the hot gas generator are supplied to the evaporator at a pressure in a range from about 60 inches negative to about 120 inches positive of water. In all other respects the caustic liquid treatment system of FIG. 3 is the same as that shown in FIG. 1 and the evaporator 10' is the same as the evaporator 10 illustrated in FIG. 2.

In accordance with the invention, spent caustic effluent from petroleum refineries or the like can be concentrated efficiently and effectively without requiring a heat exchange evaporator of the type used in conventional spent caustic effluent treatment systems having surfaces which can be fouled by the effluent residue and therefore require periodic cleaning or replacement. Typical oil refinery spent caustic effluents which can be processed by the present invention include sulfidic, cresylic and naphthenic effluents.

As described in the paper entitled "Effluent Caustic Treating Systems Using MERICON$^{SM}$ Technologies" by Merichem Chemicals and Refinery Services LLC., sulfidic caustic effluents are produced by fuel gas, liquefied petroleum gas (LPG) and gasoline treating processes. A typical refinery sulfidic caustic stream has the composition shown in Table 1 below. The usual contaminants are sodium sulfide and sodium mercaptide. These compounds cause high chemical and biological oxygen demand in the treatment process and produce odors and dangerous gases when neutralized.

TABLE 1

| Free NaOH, wt % | 2 to 10 |
| Sulfides and Bisulfides as S. wt % | 0.5 to 4 |
| Mercaptides as S, wt % | 0.1 to 4 |
| Carbonates as $CO_3$, wt % | 0 to 4 |
| pH | 13 to 14 |
| Ammonia | Trace |

Commercial uses of sulfidic caustic solutions concentrated in accordance with the invention are as treating agents in pulp and paper processing and for purifying certain metal ores in the mining industry.

Cresylic caustic effluents, which contain aromatic acid oils, are produced by caustic treating of cracked gasoline and cracked distillates. Cresylic caustic streams contain phenols, cresols and other organic acids that are generally present as water-soluble cresylates which will separate from the caustic as acid oils at a neutral pH. Cresylic caustic solutions produced from treating cracked gasolines generally come from two sources: 1) mercaptan extraction or oxidation systems using strong caustic; and 2) mercaptan oxidation systems using weak caustic. Table 2 below shows the characteristics of typical cresylic caustic effluents.

TABLE 2

|  | Strong Caustic Operation | Dilute Caustic Operation |
| --- | --- | --- |
| NaOH, wt % | 10 to 15 | 1 to 4 |
| Sulfides as S. wt % | 0 to 1 | 0 to 0.2 |
| Mercaptides as S, wt % | 0 to 4 | 0 to 0.5 |
| Cresylic Acids, wt % | 10 to 25 | 2 to 5 |
| Carbonates as $CO_3$, wt % | 0 to 0.5 | 0 to 0.1 |
| pH | 12 to 14 | 12 to 14 |

Concentrated cresylic caustic solutions have commercial value as chemical intermediates.

Naphthenic caustic solutions are generated from caustic treatment of kerosene and diesel cuts from a naphthenic crude slate. Table 3 below shows typical characteristics of naphthenate streams derived from kerosene and diesel stocks.

TABLE 3

|  | Jet Fuel/Kerosene | Diesel |
| --- | --- | --- |
| NaOH, wt % | 1 to 4 | 1 to 4 |
| Sulfides as S-, wt % | 0 to 0.1 | Trace |
| Mercaptides as S+, wt % | 0 to 0.5 | 0 to 0.5 |
| Naphthenic acids, wt % | 2 to 10 | 2 to 15 |
| Cresylics, wt % | 1 to 3 | 0 to 1 |
| pH | 12 to 14 | 12 to 14 |

Concentrated naphthenic caustic solutions have potential commercial value to processors who refine them for sale to producers of naphthenate metal salts.

Petroleum refineries typically pay costs for shipping, treatment and disposal of raw industrial waste liquids including spent caustic. The refineries would find it useful to repurchase both the caustic liquid and oil for re-use in their process if they can be deodorized and the sodium hydroxide equivalency concentrated to acceptable values. In accordance with the present invention, petroleum refinery spent caustic can be processed to satisfy those requirements effectively and efficiently.

In a pilot test of the process of the invention, a significant reduction in the level of odor in the concentrated liquid was obtained compared to the feed material. The concentrated liquid was a two-phase mixture of oil and an aqueous phase that could be readily separated by gravity separation such as decanting. After decanting, the aqueous phase assay showed that a significant concentration of caustic was achieved. The assay also showed almost 100% conversion of the sodium hydroxide in the spent caustic effluent to sodium carbonate because of the reaction of carbon dioxide in the combustion gas with the hydroxide as discussed hereinafter. In this test the concentration of sodium carbonate in the concentrated aqueous phase was approximately 30% (w/w). In this regard, the direct combustion gas sparge that takes place in the submerged combustion gas evaporator during the process causes the formation of carbonic acid in the water that is present within the evaporator during processing and carbonic acid then reacts with the caustic constituent, sodium hydroxide, to form sodium carbonate in the manner described below.

The dilute caustic feed material for the pilot test was an approximate 1:1 blend of two by-products of refinery operations known as the "sulfidic" and "cresylic" spent caustic streams. Assays of each of these streams and the material used as feed for the pilot test are presented in Table 4 below.

TABLE 4

Composition of Constituent Feed Streams and Mix Average

| | DILUTE CAUSTIC | | Pilot Unit Feed |
| --- | --- | --- | --- |
| | Stream 1 Sulfide | Stream 2 Cresylate | (1:1 Mixture of Streams 1 & 2) |
| | Test Results, %[1] | | |
| Sodium Hydroxide | 10.82 | 10.04 | 10.43 |
| Sodium Carbonate | 2.65 | 4.14 | 3.40 |
| Sodium | 7.66 | 7.66 | 7.66 |
| CO2 | 1.1 | 1.72 | 1.41 |
| Inorganic Carbon | 0.29 | 0.47 | 0.38 |
| Hydrogen Sulfide | 0.37 | 0.15 | 0.26 |
| Total Sulfur as S | 0.62 | 1.06 | 0.84 |
| Total Carbon | 0.45 | 7.76 | 4.11 |
| Water | 86.87 | 76.12 | 81.50 |
| Total Hydrocarbon | 0 | 0 | 0 |
| Total Mercaptans | 0.12 | 0.55 | 0.34 |
| Cresols | 0.04 | 2.82 | 1.43 |
| Phenol | 0.02 | 1.31 | 0.67 |
| Alkyl Phenols | 0.03 | 2.74 | 1.39 |

[1]The total of all percentages is greater than one-hundred because some elements are double counted within various compounds.

The goal of the pilot test was to both deodorize and concentrate the sodium hydroxide content of a caustic material that was produced as a by-product in petroleum refining operations. Because the combustion gas supplied to the evaporator contained carbon dioxide, it was anticipated that some portion of the sodium hydroxide would be converted to sodium carbonate. It was not known how the mixture of oils carried within the caustic feed material would affect, or be affected by, the process.

The results of the pilot test showed that the sodium hydroxide had been converted almost entirely to sodium carbonate, and that an oil phase was produced that was immiscible with the aqueous sodium carbonate phase.

Decanting easily separated the two immiscible phases. Each of the phases produced in the experiment was judged to have significantly reduced levels of odor compared to the feed material, demonstrating that the objective of deodorizing the dilute caustic feed during the process had been achieved.

Table 5 below shows a comparison of selected constituents in the material used as feed to the pilot unit and the aqueous phase produced as a result of subjecting the material to the combined deodorization/evaporation process. In the test, the volume of the feed material was reduced to approximately one-third of the original spent caustic effluent liquid volume.

TABLE 5

Comparison of Feed Material with Concentrate Aqueous Phase from First Pilot Test

| | Feed | Final | Comments |
| --- | --- | --- | --- |
| | Test Results, %[1] | | |
| Sodium Hydroxide | 10.43 | 0.5 | |
| Sodium Carbonate | 3.4 | 29.71 | |
| Sodium | 7.66 | | not tested |
| CO2 | 1.41 | | not tested |
| Inorganic Carbon | 0.38 | | not tested |
| Hydrogen Sulfide | 0.26 | | not tested |
| Total Sulfur as S | 0.84 | 0.41 | |
| Total Carbon | 4.11 | | not tested |
| Water | 81.5 | | not tested |
| Total Hydrocarbon | 0 | | not tested |
| Total Mercaptans | 0.34 | | not tested |
| Cresols | 1.43 | 0.38 | |
| Phenol | 0.67 | 0.44 | |
| Alkyl Phenols | 1.39 | | not tested |

[1]The total of all percentage for the feed sample is greater than one-hundred because some elements are double counted within various compounds.

The results of two subsequent pilot tests were similar. In each test the oil that was recovered after the combined deodorization/evaporation process had concentrated the total volume of feed material was between 10% and 15% of the total volume of feed material processed.

During the evaporation process the carbon dioxide contained in the combustion gas injected into the aqueous spent caustic liquid reacted with the water to produce carbonic acid in accordance with the following equation:

$$CO_2 + H_2O = H_2CO_3 \qquad (1)$$

and the carbonic acid reacted with the sodium hydroxide to produce sodium carbonate and water in accordance with the following equation:

$$2NaOH + H_2CO_3 = Na_2CO_3 + 2H_2O \qquad (2)$$

From the foregoing it will be seen that each mol of carbon dioxide in the combustion gas injected into the caustic liquid converts two mols of sodium hydroxide to one mol of sodium carbonate and one mol of water. The molecular weight of carbon dioxide is 44 and that of sodium hydroxide is 40, while the molecular weight of carbonic acid is 62, that of sodium carbonate is 106 and that of water is 18. Accordingly, 10,000 lbs. of a 10% sodium hydroxide solution produces 1,325 lbs. of sodium carbonate and 450 lbs. of water and consumes 550 lbs. or 4,488 standard cubic feet of carbon dioxide. Consequently, with a spent caustic feed that weighs 9.237 lbs. per gallon containing 10% of sodium hydroxide (w/w), each 10,000 gallons treated sequesters 41,451 cubic feet of carbon dioxide, for an average of 30,000 gallons per day of spent caustic effluent treated, 2,781 tons of carbon dioxide per year are sequestered and therefore prevented from release to the atmosphere. Thus, the commercial value of the process includes the direct environmental and economic benefits, i.e., potential revenue for managing spent caustic effluent, the potential sale of recovered product or products, the mitigation of greenhouse gas emissions with the potential for generating commercially valuable "carbon credits" in direct proportion to the quantity of greenhouse gas that is sequestered. If desired, caustic liquid which is a commercially available product rather than a spent caustic effluent may be supplied to the evaporator to sequester carbon dioxide.

The method may be used to process caustic effluents with or without the recovery of products or solely for the purpose of sequestering carbon dioxide contained in the combustion gas supplied to the evaporator.

Although the invention has been described herein with reference to specific embodiments, many modifications and variations therein will readily occur to those skilled in the art. Accordingly, all such variations and modifications are included within the intended scope of the invention.

We claim:

1. A method for treating caustic effluents comprising:
   supplying a caustic effluent to a submerged combustion gas evaporator; and
   supplying combustion gas to the submerged combustion gas evaporator at a temperature and quantity high enough to vaporize water and volatile constituents in the caustic effluent and concentrate a constituent of the caustic effluent,
   wherein the combustion gas supplied to the submerged combustion gas evaporator contains carbon dioxide and including the step of reacting the carbon dioxide with a caustic constituent of the caustic effluent to convert the caustic constituent to a carbonate, thereby sequestering carbon dioxide from the combustion gas.

2. A method according to claim 1 including thermally oxidizing vaporized constituents removed from the caustic effluent to eliminate odorous and other volatile materials from gaseous constituents released to the atmosphere.

3. A method according to claim 1 wherein the caustic effluent includes an aqueous caustic liquid and oil and including the step of separating at least some of the oil from the aqueous constituent in an immiscible liquid separator.

4. A method according to claim 3 wherein the immiscible liquid separator is a gravity settling tank, an inclined plate separator or a centrifuge.

5. A method according to claim 1 wherein the content of caustic material in the caustic effluent supplied to the combustion gas evaporator has a sodium hydroxide equivalency within a range from about one percent to about fifty percent by weight.

6. A method according to claim 1 including maintaining the caustic effluent in the submerged combustion gas evaporator at a level between about 5 inches and about 100 inches above the level at which the combustion gas is supplied into the evaporator.

7. A method according to claim 1 including maintaining an operating pressure within the submerged combustion gas evaporator in a range from about 50 inches negative to about 100 inches positive of water.

8. A method according to claim 1 including supplying a fuel and air mixture at a pressure in a range from about 5 inches to about 200 inches of water to a burner to produce the combustion gas.

9. A method according to claim 1 including supplying a stack gas from a separate combustion process to the submerged combustion gas evaporator at a pressure in a range from about 60 inches negative to about 120 inches positive of water.

10. A method according to claim 1 including maintaining an operating temperature within the submerged combustion gas evaporator within a range from about 100° F. to about 250° F.

11. A method according to claim 1 wherein the caustic effluent contains oil and including the step of removing at least some oil from the caustic effluent before supplying the caustic effluent to the submerged combustion gas evaporator.

12. A method according to claim 1 wherein supplying a caustic effluent to a submerged combustion gas evaporator includes supplying a sulfidic caustic effluent to the submerged combustion gas evaporator.

13. A method according to claim 1 wherein supplying a caustic effluent to a submerged combustion gas evaporator includes supplying a cresylic caustic effluent to the submerged combustion gas evaporator.

14. A method according to claim 1 wherein supplying a caustic effluent to a submerged combustion gas evaporator includes supplying a napthenic caustic effluent to the combustion gas evaporator.

15. A method according to claim 1 wherein supplying a caustic effluent to a submerged combustion gas evaporator includes supplying any combination of sulfidic, cresylic and napthenic caustic effluents to the combustion gas evaporator.

16. A method according to claim 1 including sequestering at least some carbon dioxide from the combustion gas by converting a caustic effluent constituent from a hydroxide to a carbonate.

17. A method according to claim 1 including stripping at least some volatile compounds from the caustic effluent in an air stripper prior to supplying the caustic effluent to the evaporator and supplying air from the air stripper containing volatile compounds to a burner used to produce the combustion gas.

18. A method for treating caustic materials comprising supplying a caustic solution which has a sodium hydroxide equivalency in a range from about one percent to about fifty percent to a submerged combustion gas evaporator and supplying combustion gas which contains carbon dioxide to the combustion gas evaporator and wherein the carbon dioxide reacts with the caustic solution to convert a hydroxide constituent thereof to a carbonate, thereby sequestering carbon dioxide from the combustion gas.

19. A method for treating caustic effluents comprising:
   supplying a caustic effluent to a submerged combustion gas evaporator; and
   supplying combustion gas to the submerged combustion gas evaporator at a temperature and quantity high enough to vaporize water and volatile constituents in the caustic effluent and concentrate a constituent of the caustic effluent,
   wherein supplying a caustic effluent to a submerged combustion gas evaporator includes supplying a sulfidic caustic effluent to the submerged combustion gas evaporator.

20. A method for treating caustic effluents comprising:
   supplying a caustic effluent to a submerged combustion gas evaporator; and
   supplying combustion gas to the submerged combustion gas evaporator at a temperature and quantity high enough to vaporize water and volatile constituents in the caustic effluent and concentrate a constituent of the caustic effluent, wherein supplying a caustic effluent to a submerged combustion gas evaporator includes supplying a cresylic caustic effluent to the submerged combustion gas evaporator.

21. A method for treating caustic effluents comprising:

supplying a caustic effluent to a submerged combustion gas evaporator; and supplying combustion gas to the submerged combustion gas evaporator at a temperature and quantity high enough to vaporize water and volatile constituents in the caustic effluent and concentrate a constituent of the caustic effluent, wherein supplying a caustic effluent to a submerged combustion gas evaporator includes supplying a napthenic caustic effluent to the combustion gas evaporator.

22. A method for treating caustic effluents comprising:

supplying a caustic effluent to a submerged combustion gas evaporator; and supplying combustion gas to the submerged combustion gas evaporator at a temperature and quantity high enough to vaporize water and volatile constituents in the caustic effluent and concentrate a constituent of the caustic effluent, wherein supplying a caustic effluent to a submerged combustion gas evaporator includes supplying any combination of sulfidic, cresylic and napthenic caustic effluents to the combustion gas evaporator.

23. A method for treating caustic effluents comprising:

supplying a caustic effluent to a submerged combustion gas evaporator;

supplying combustion gas to the submerged combustion gas evaporator at a temperature and quantity high enough to vaporize water and volatile constituents in the caustic effluent and concentrate a constituent of the caustic effluent; and sequestering at least some carbon dioxide from the combustion gas by converting a caustic effluent constituent from a hydroxide to a carbonate.

24. A method for treating caustic effluents comprising:

supplying a caustic effluent to a submerged combustion gas evaporator;

supplying combustion gas to the submerged combustion gas evaporator at a temperature and quantity high enough to vaporize water and volatile constituents in the caustic effluent and concentrate a constituent of the caustic effluent; and stripping at least some volatile compounds from the caustic effluent in an air stripper prior to supplying the caustic effluent to the evaporator and supplying air from the air stripper containing volatile compounds to a burner used to produce the combustion gas.

* * * * *